United States Patent [19]

Yaroshenko et al.

[11] 4,143,591

[45] Mar. 13, 1979

[54] DEVICE FOR THE PRODUCTION OF GRANULATED PRODUCTS FROM SOLUTIONS OR SUSPENSIONS OF FOOD SUBSTANCES

[75] Inventors: Jury F. Yaroshenko; Rodriges S. Gonsales; Sergei V. Rogozhin; Vladimir I. Misjurev, all of Moscow, U.S.S.R.

[73] Assignee: Vsesojuzny nauchno-issledovatelsky i experimentalno-konstruktorsky institut prodovolstvennogo mashinostroenia VNIEKIPRODMASH, U.S.S.R.

[21] Appl. No.: 808,389

[22] Filed: Jun. 20, 1977

[30] Foreign Application Priority Data

Jun. 28, 1976 [SU] U.S.S.R. ............... 2378188[I]

[51] Int. Cl.² ............................................. A23C 9/02
[52] U.S. Cl. ..................................... 99/483; 426/438
[58] Field of Search .................. 99/334, 355, 357, 403, 99/406, 407, 470, 483, 484, 485; 426/438, 802, 643; 425/6, 70; 264/13–14

[56] References Cited

U.S. PATENT DOCUMENTS

| | | | |
|---|---|---|---|
| 2,738,548 | 3/1956 | Kassel | 425/6 |
| 3,206,799 | 9/1965 | Davies | 425/6 |
| 3,499,379 | 3/1970 | Nesmeyanov | 425/6 |
| 3,642,393 | 2/1972 | Ross | 425/6 |
| 3,869,976 | 3/1975 | Nesmeyanov | 99/484 |

*Primary Examiner*—Leonard D. Christian
*Attorney, Agent, or Firm*—Steinberg & Blake

[57] ABSTRACT

The present invention relates to food industry equipment. It is particularly adapted for use in the production of granulated food products, preferably imitation soft caviar. The device is provided with a heated chamber for keeping said solutions or suspensions under pressure, which has through holes drilled along a concentrical circumference in the chamber bottom. Tightly pressed to the bottom from inside is a revolving disk with through holes that are to match the holes in the chamber bottom during rotation of the disk. A vessel is installed under said chamber to contain a forming liquid and to form granules from the solutions or the suspensions fed into the vessel via the holes in the bottom of said chamber. This vessel is cooled and accommodates a pipe for feeding the forming liquid to the vessel and a pipe for taking it out of the vessel together with formed granules. This vessel jointed to the chamber bottom through a heat-insulating spacer with nozzles coaxial with the holes in the bottom is actually a tubular heat exchanger, whose tubes communicate with the holes in the chamber bottom via the nozzles. Each nozzle concentrically protrudes from the spacer into the upper end of the respective tube with an annular gap allowing the tubes to communicate with each other and with the forming liquid feeding pipe. The granules forming device of this design makes it possible to retain the food value of formed granules and to raise the efficiency of the device considerably.

7 Claims, 4 Drawing Figures

DEVICE FOR THE PRODUCTION OF GRANULATED PRODUCTS FROM SOLUTIONS OR SUSPENSIONS OF FOOD SUBSTANCES

The proposed invention relates to food industry equipment, and more particularly to installations for the production of granulated products from the solutions or the suspensions of food substances.

The present invention is particularly adapted for use in the production of granulated food products, preferably imitation soft caviar.

Known in the art are installations for the production of granulated products from solutions or suspensions of food substances (see U.S. Pat. No. 3,869,976 IPS A23p 1/00), which comprise a heated chamber for accommodation of said solutions or suspensions held under pressure with the bottom of said chamber provided with holes along a concentrical circumference thereof, a rotatable disk spring-urged to the bottom from inside the chamber and also provided with through holes matching, in succession, with the holes in the chamber bottom during rotation of the disk, a vessel arranged under the chamber and containing liquid forming granules from the solutions or the suspensions fed into the vessel through the holes in the chamber bottom, said vessel being provided with a cooling means and communicating with pipes for supplying the forming liquid into the vessel and discharging it together with formed granules therefrom.

In the known installations the vessel is fashioned as an open tank filled with liquid forming granules and referred to hereinafter the granules forming liquid. The bottom of the heated chamber is submerged into the forming liquid. The solution or the suspension of food substances held in a heated state in the chamber is forced under pressure into the upper layers of the forming liquid in the form of metered drops due to successive matching of the holes in the disk with the holes in the chamber bottom. Separate metered drops of the source solution getting into the upper layers of the forming liquid assume, under the action of the surface tension forces, the form of ball-like granules. Therefore, the upper part of the vessel is called the granules forming zone. The upper part of the vessel is heated to maintain a preset temperature of the forming liquid with a resultant decrease of its viscosity, which in its turn facilitates sinking of the granules from the forming zone to the lower layers of the forming liquid. The formed granules sink under gravity to the lower portion of the vessel provided with coolers with coolant circulating inside to cool the forming liquid. The lower portion of the vessel is called the cooling zone. Cooling of granules in the cooling zone results in the transformation of the liquid solution into hard gel. The hard granules are carried by the cold forming liquid flow from the vessel via a pipe to an arrangement for separating hard granules from the forming liquid. Freed from the granules the forming liquid returns to the vessel cooling zone along a pipeline. The forced circulation of the forming liquid is effected by a pump installed in the line between said granules separating arrangement and the vessel. The circulation of the forming liquid thus effected makes it possible to carry formed granules away from the vessel cooling zone. However, the migration of granules from the vessel forming zone to the vessel cooling zone occurs only owing to the gravity force. Therefore, granules formed in close proximity with the chamber bottom have too little time to set off the bottom quickly due to a comparatively greater viscosity of the forming liquid. Subsequent metered drops getting into the forming liquid collide with some previously formed but still soft granules, which leads to the formation of larger granules considerably differing in size from the standard-size granules, thus impairing the quality of the product. In addition the construction of the known device provides for the necessity of heating the forming liquid within the granules forming zone. If the forming liquid is not heated in the granules forming zone of the vessel, the chamber bottom would get cooled with a resultant solidification of the solution or the suspension of the food substances in the holes of the chamber bottom, which would lead to clogging of the holes and malfunctioning of the device.

The granules descending from the forming zone to the cooling zone of the vessel partially entrain the forming liquid preheated to a preset temperature, thereby disturbing the temperature conditions of the forming liquid and reducing the effect of cooling the granules in the cooling zone to the desired temperature. This also deteriorates the quality of the granules. Besides, since the formation of granules takes place in the heated forming liquid, the granules food substances partially dissolve in this liquid. On the one hand, this reduces the food value of the granules, and on the other hand, this irreversibly changes and rapidly deteriorates the forming liquid. The deterioration of the forming liquid is promoted also due to its contact with the atmospheric air, because the vessel is open from the chamber side.

To ensure reliable formation of granules in the known devices, the vessel containing the forming liquid must be sufficiently large in volume. For instance, if the output of the device is 20 kg of granules per hour, the vessel must contain 160 to 200 lit of forming liquid. As a common practice, rather expensive vegetable oil is employed as a forming liquid. In view of the above mentioned reasons, the forming liquid must be changed every day, which leads to a considerable consumption of the expensive oil and to reduction of the efficiency of the device. Any material reduction of the amount of the forming liquid in the known device will result in insufficient cooling of the granules with a consequent coalescence of the metered drops escaping from adjacent holes in the chamber bottom. This results in the formation of granules differing in size and finally leads to a reduction of the quality of the outcoming product. An increase in the amount of the forming liquid contained in the vessel involves difficulties in its uniform cooling, which brings about non-uniform hardening of granules with a resultant change of the product quality for the worse.

During starting of the device granules are not carried away from the vessel at once by the circulating flow of the forming liquid. Some part of the granules remains in the vessel saturating the liquid in the forming zone. This occurs due to disorganized and spontaneous movement of granules from the forming zone to the cooling one. Since the amount of liquid is considerable, the time period required for saturation of the forming liquid with granules is rather great in starting. For instance, the saturation time for a device having an output of 20 kg of granules per hour falls within 20-30 min. The number of granules taken from the vessel varies from zero to a predetermined value in the course of this time. Since further treatment of granules takes place in devices operating continuously and designed to be charged with a definite quantity of granules per time unit, non-uniform delivery of granules into these devices during start-off periods will impair the quality of the product to such a degree that the product obtained during such start-off periods of the device cannot be used further.

A similar phenomenon occurs during shutdown of the known device. After the supply of the solution or the suspension of the food substances from the chamber into the vessel filled with the forming liquid is cut off, the granules found in the forming liquid still continue to be carried away by the forming liquid for some 20 to 30 minutes in quantities changing from a predetermined value to zero. As a result, the outcoming granulated product obtained in the known device during start-off periods cannot be brought to the required condition and utilized completely. The loss of granules amounts to 10 percent the output of the device per shift.

Besides, the forming liquid circulates in the known device only within the cooling zone of the vessel, which is functionally associated with spontaneous sinking of granules from the forming zone to the cooling zone of the vessel only under the gravity force, thus limiting the output of the known device. In case an attempt is made to increase the supply of metered drops from the chamber into the granules forming zone of the vessel, the granules conjoin in the zone, which leads to the formation of granules differing in size. Moreover, the dwelling time of the granules in the vessel zones is not equal; as a consequence, the granules are cooled and grow hard in the forming liquid to a different degree, which also impairs the quality of the outcoming granules.

The main object of the present invention is to provide a device for the production of granules from a solution or a suspension of food substances in a forming medium contained in a vessel so designed as to ensure an outcome of granules of the required quality.

Another object of the present invention is to reduce the consumption of the forming liquid considerably.

Yet another object of the invention is to considerably increase the output of the device for the production of granulated products from the solutions or the suspensions of food substances.

These and other objects of the present invention are accomplished by providing a device for the production of granulated products from solutions or suspensions of food substances, which comprises: a heated chamber for keeping said solutions or suspensions under pressure, whose bottom has, along the circumference thereof, holes that are to match with the holes of a revolving disk tightly pressed against the chamber bottom and to feed the starting solution or the suspension into a vessel, which is arranged below said chamber bottom and intended to accommodate a forming liquid and to form granules in the forming liquid from said solutions or suspensions supplied into the vessel via the chamber bottom holes, the vessel being cooled and communicating with a pipe for feeding the forming liquid to and a pipe for discharging it out of the vessel together with formed granules, wherein, according to the invention, said vessel is jointed to the chamber bottom through a heat-insulating spacer and is fashioned as a tubular heat exchanger with the upper ends of the tubes arranged in axial alignment with the holes in the chamber bottom; said heat-insulating spacer comprises nozzles made coaxially with the holes in the above chamber bottom and communicating said holes with the tubes of the heat exchanger, each nozzle protruding into the upper end of the respective tube of the heat exchanger with an annular gap formed between each nozzle and tube to intercommunicate the heat-exchanger tubes and provide communication with the forming liquid feeding pipe, the total number of the nozzles being equal to the number of the heat-exchanger tubes and the number of the holes in the chamber bottom.

The granules forming device of this design makes it possible to do without heating the forming liquid in the granules forming zone and employ the forming liquid flow for carrying away granules from the forming zone. The provision of forced conveyance of granules by the flow of cool forming liquid uniformly streaming past each of the nozzles via the annular gaps and taking each metered drop off the nozzle precludes any possiblity of collision and coalescence of successive non-congealed granules. The arrangement of each current of granules formed from metered drops which escape from one and the same nozzle inside the same tube of the heat exchanger precludes collision and coalescence of granules coming out of neighbouring nozzles. All this permits to increase the output of the granules forming device considerably.

The provision of forced conveyance of formed granules along the heat-exchanger tubes improves heat transfer, which makes it possible to reduce the amount of forming liquid in the vessel considerably and at the same time to attain uniform and equal cooling and growing hard of all granules, and hence to achieve a high quality of the outcoming product. Since the forming liquid within the forming zone of the vessel is not heated, the circulating forming liquid may be fed directly into that zone. The provision of a heat-insulating spacer between the heated chamber and cold heat exchanger makes it possible to keep the forming liquid under a comparatively low temperature, which in turn precludes partial dissolving of the granules food substances in the forming liquid, thereby maintaining their food value and preventing deterioration of the forming liquid, thus increasing its life time with a resultant reduction of the consumption of the forming liquid.

Reduced amount of the forming liquid and forced conveyance of granules along the heat-exchanger tubes make it unnecessary to "saturate" the vessel contents with granules, at the same time providing a uniform evacuation of granules from the device in the start-off periods and contributing to a more complete utilization of the produced granules with a resultant material increase in the efficiency of the device.

In accordance with the invention, the upper ends of the heat-exchanger tubes are built into a common flange adjoining the heat-insulating spacer and providing an in-between cavity to intercommunicate the tubes and communicate the tubes with the forming liquid feeding pipe.

The provision of said cavity offers a possibility of uniformly supplying the forming liquid into the heat-exchanger tubes and helps to maintain a uniform velocity of the forming liquid flow in the tubes. Furthermore, a uniform and similar flowing-around of the nozzles with the forming liquid passing through the annular gaps provides a laminar flow of the forming liquid in the tubes, thereby providing a rapid conveyance of formed granules from the nozzles, precluding their collision and coalescence, thus ensuring the production of uniformly sized conglobate granules and contributing to a still further increase in the output of the granules forming device and in the quality of the outcoming product.

According to the invention, said cavity can be formed by a recess machined in the flange body.

In accordance with the invention, said cavity can be formed by a recess made in the heat-insulating spacer.

According to the invention, said cavity can be formed partially by a recess machined in the flange body and partially by a recess made in the heat-insulating spacer.

It is preferable that the nozzles be tapered downwards and the upper ends of the tubes be expanding topwise.

The nozzles and the upper ends of the tubes also can be made cylindrical.

It is expedient that the heat-exchanger tubes be arranged inside a shell adapted for circulation of a cooling agent.

Such configuration and arrangement of the nozzles and upper ends of the tubes help to maintain a constant preset temperature of the forming liquid circulating via the heat-exchanger tubes, which is essential for transformation of liquid protein into gel.

Given below is a detailed description of the device for the production of granulated products from solutions or suspensions of food substances; the invention will be readily understood from the detailed description, in which reference will be made to the accompanying drawings, wherein.

Figure 1:
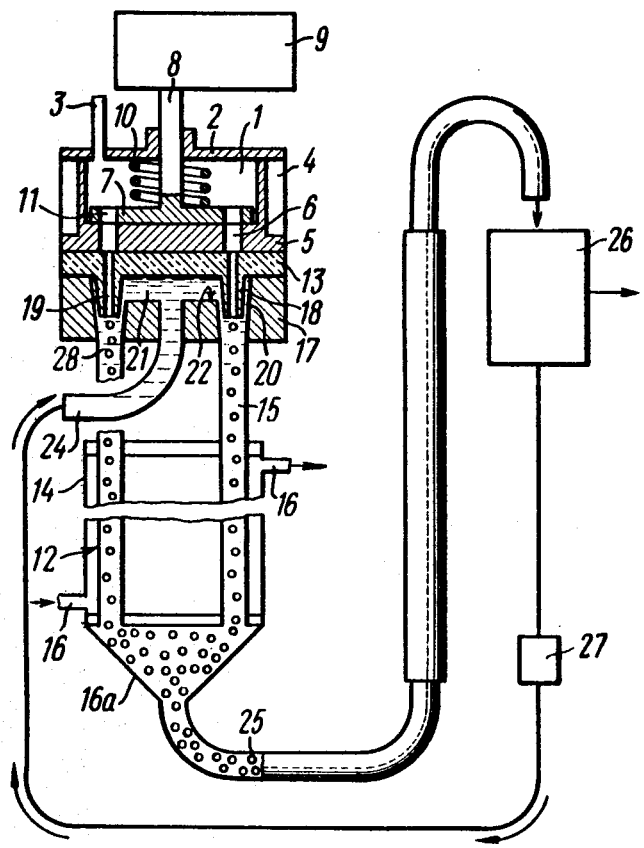
FIG. 1 is a schematic view of the device for the production of granulated products from solutions or suspensions of food substances according to the invention (vertical sectional view)

The device for the production of granulated products from solutions or suspensions of food substances comprises a heated chamber 1 (FIG. 1) for accommodation and pressure-controlled feed of said solutions or suspension. The cylindrical vertically installed on the top chamber 1 has a cover 2 provided with a branch pipe 3 for feeding the solutions or the suspensions into the chamber 1 under pressure. Externally, said chamber 1 has an annular cavity 4 (as shown in FIG. 1) for circulation of a heat-carrying agent. The lower end face of the chamber 1 is the bottom 5 of the chamber. Provided in the bottom 5 of the chamber along a concentrical circumference are equally spaced through holes 6 intended for discharge of the solution or the suspension of food substances from the chamber 1. Arranged internally from the bottom of the chamber 1 is a rotatable disk 7 tightly pressed against the bottom 5 of the chamber. The disk 7 is suitably secured to the shaft 8 connected with a drive 9, which is installed outside the chamber 1. The drive 9 can be of any known design appropriate for the purpose. A spring 10 is arranged under compression on the shaft 8 inside said chamber between the cover 2 and disk 7 to urge the latter to be in close contact with the bottom 5 of the chamber 1. The mating surfaces of the disk 7 and bottom 5 are flat, but they may be of any other shape, tapered and spherical configurations included (not shown in FIG. 1). The spring-urged disk 7 is held in close contact with the bottom 5, thereby precluding penetration of the solution or the suspension between the parts. The disk 7 also has equally spaced through holes il along a concentrical circumference. During rotation of the disk 7 the holes in the disk match, in succession, with the holes 6 in the bottom 5. Arranged under the chamber 1 is a vessel filled with liquid forming granules from the solution or the suspension. According to the invention, said vessel is made in the form of a tubular heat exchanger 12 attached to the bottom 5 of the chamber 1 through the medium of a heat-insulating spacer 13.

The heat exchanger 12 comprises a shell 14 and tubes 15 installed vertically inside the shell. In accordance with the invention, the number of the tubes 15 is equal to the number of the holes 6 in the bottom 5. The shell 14 of the heat exchanger 12 is fashioned as a cylinder vertically installed and hermetically sealed at its ends. According to the invention, the shell 14 is adapted for circulation of a cooling agent. Provided in the cylindrical wall of the shell 14 near its ends are branch pipes 16, one for delivery and the other for discharge of the cooling agent circulating via the shell 14. Made in the top end face of the shell 14 are holes through which the upper ends of the tubes 15 are passed. The lower end face of the shell 14 has similar through holes intended to receive the lower ends of the tubes 15.

Arranged externally from the lower end face of the shell 14 and tightly fitted to the lower end face of the shell is a tapered bottom 16a converging downwards (as shown in FIG. 1) and terminating in a central outlet hole. Thus, each tube 15 communicates with the interior space of the tapered bottom 16a. A flange 17 made in the form of a disk and adjoining the heat-insulating spacer 13 from below is fixed together with the latter to the bottom 5, as shown in FIG. 1. The flange 17 also has through holes to receive the upper ends of the tubes 15 arranged in axial alignment with the holes 6 in the bottom 5 of the chamber 1.

The heat-insulating spacer 13 has nozzles 18 on the side facing the flange 17, said nozzles being provided with through holes communicating the tubes 15 with the holes 6 in the bottom 5 of the chamber 1. The number of the nozzles 18 is equal to that of the tubes 15 of the heat exchanger 12 and to the number of the holes 6 in the bottom 5 of the chamber 1. According to the invention, each nozzle 18 protrudes into the upper end of the respective tube 15 with an annular gap 20.

The nozzles 18 are tapered downwards and the upper ends of the tubes 15 of the heat exchanger 12 are expanding topwise; therefore, each annular gap 20 formed therebetween is converging downwards, as shown in FIG. 1. This configuration of the annular gap 20 is the most optimum for maintaining a laminar flow of the forming liquid in the tubes 15.

Figure 2:
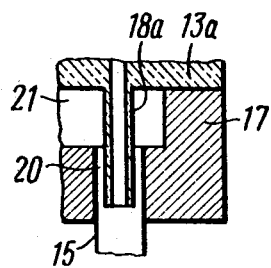
FIG. 2 is an enlarged fragmentary sectional view of the nozzle and tube upper end of the cylindrical tubular heat exchanger, according to the invention.

The nozzles 18 of the heat-insulating spacer 13a and the upper ends of the tubes 15, as shown in FIG. 2, may be cylindrical. In this case each annular gap 20 between the parts is also cylindrical.

Formed between the heat-insulating spacer 13 (or 13a) and flange 17 is a cavity 21 intercommunicating the tubes 15. The cavity 21 is formed by a cylindrical recess 22 in the flange 17 on the side opposing the heat-insulating space 13 (or 13a), as shown in FIGS. 1 and 2. The recess 22 is machined so that the holes in the flange 17 receiving the upper ends of the tubes 15 communicate with the cavity 21, as illustrated in FIGS. 1 and 2. The depth of the recess 22 is somewhat less than the length of the nozzles 18 (or 18a).

Figure 3:
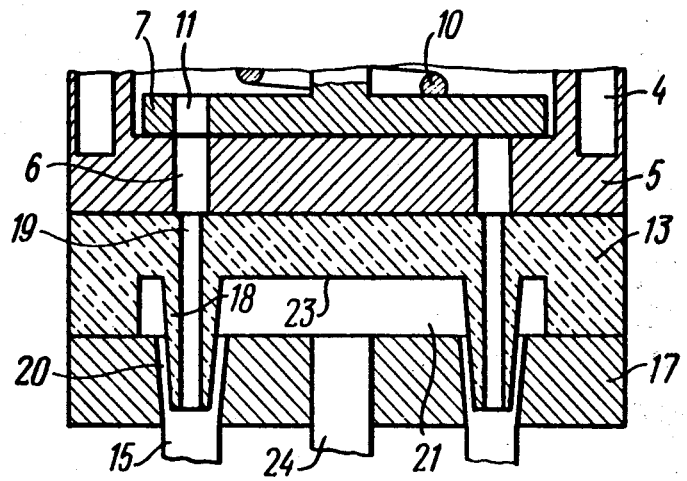
FIG. 3 is an enlarged fragmentary sectional view of the cavity formed in the heat-insulating spacer, according to the invention.

Referring to FIG. 3, the cavity 21 is formed by a cylindrical recess 23 made in the heat-insulating spacer 13 on the side facing the flange 17. The diameter of the recess 23 is greater than the distance between the outermost points of the nozzles 18, and a certain gap is formed between the nozzles 18 and the recess periphery. The height of the recess 23 is somewhat less than the length of the nozzles 18.

Figure 4:
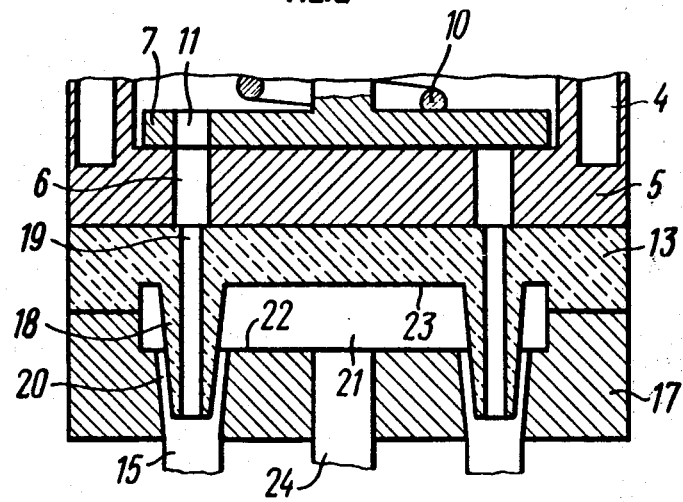
FIG. 4 is an enlarged fragmentary sectional view of the cavity formed partially in the flange and partially in the heat-insulating spacer, according to the invention.

Referring to FIG. 4, the cavity 21 is formed partialla by a recess 22 and partially by a recess 23. The height of the cavity 21 is somewhat less than the length of the nozzles 18.

The flange 17 is provided with a central hole, in which a pipe 24 (FIG. 1) is fixed to feed the forming liquid into the cavity 21 and to provide communication between the pipe and the tubes 15 via said cavity 21 and gaps 20.

The proposed device for the production of granulated products is provided with a pipe 25 for discharging the forming liquid together with the formed granules from the heat exchanger 12. One end of the pipe 25 is secured in the central hole of the tapered bottom 16a, the other end of the pipe is brought to the device 26 which separates granules from the forming liquid supplied from the heat exchanger. The device 26 is in communication with the heat exchanger 12 via the pipe 24 returning the forming liquid to the heat exchanger. Installed in the line of the pipe 24 is a pump 27 providing circulation of the forming liquid within the following closed circuit: pipe 24, heat exchanger 12, pipe 25, device 26. The pump 27 can be of any known type suitable for the purpose.

The device for the production of granulated products from the solutions or the suspensions of food substances operates as follows.

The heat exchanger 12, pipes 24 and 25 and the device 26 are filled with the forming liquid wherein granules are formed. Used as such medium is a vegetable or mineral oil, for instance, sunflower or corn oil, or medical vaseline oil.

Cooling agent is fed into the shell 14 of the heat exchanger 12 to cool the forming liquid to a preset temperature. The cavity 4 of the chamber 1 is fed with a heating medium to raise the temperature of the chamber 1 to the predetermined value.

The preheated solution or suspension of the food substances is supplied under pressure into the heated chamber 1 through the branch pipe 3. The drive 9 must be actuated to gradually vary the rotational speed of the shaft 8. The shaft 8 imparts the desired rotation to the disk 7. The matching of the holes 11 in the disk 7 with the holes 6 in the bottom 5 results in filling the holes 6 and passages 19 of the nozzles 18 (FIG. 1) or 18a (FIG. 2) with controlled portions of the prepared solution or suspension. Compressed air fed into the chamber 1 forces the solution or the suspension portions from the chamber into the respective tubes 15 filled with the forming liquid. The forced delivery of the solution or the suspension of the food substances from the chamber 1 via said holes 6 and passages 19 lasts for the time period, during which the holes 11 in the disk match with the holes 6 in the bottom 5. As soon as the holes 6 are closed completely by the rotating disk 7, the solution or the suspension stops flowing out of the chamber 1. The portions of the solution or the suspension leave the passages 19 of the nozzles 18 (or 18a) in the shape of metered drops 28 getting into the forming liquid. The metered drops 28 are taken from the nozzles 18 (or 18a) by the forming liquid flowing past the nozzles 18 (or 18a) and under the action of the surface tension forces assume the ball-like shape.

The ball-like metered drops 28 are carried by the forming liquid flow along tubes 15 to the lower part of the heat exchanger, being cooled and transformed from the liquid ball-like drops into granules of hard gel.

The formation of granules takes place in all the tubes of the heat exchanger in a similar way as a result of successive matching of the holes 11 in the disk with the holes 6 in the bottom 5 of the chamber 1 during rotation of the disk 7.

Granules sunk by the forming liquid flow into the tapered bottom 16a from the tubes 15 are further taken by the liquid into the pipe 25 and therefrom into the arrangement 26 where separation of granules from the forming liquid takes place. The separated granules are fed for further treatment, whereas the forming liquid returns into the cavity 21, via the pipe 24, to flow further through the gaps 20 into the tubes 15. Thus, a continuous process of the production of granules from the solution or the suspension of food substances occurs in the granules forming device. To stop the operation of the device, suffice it to cut off the supply of the solution or the suspension into the chamber 1, cut out the drive 9 and stop the disk 7. All formed granules will be carried from the tubes 15 of the heat exhanger 12 and tapered bottom 16a by the forming liquid flow into the arrangement 26 to get separated from the forming liquid. Then drain the forming liquid from the granules forming device, cut out the pump 27 and perform sanitary treatment of the device.

While the invention has been illustrated and described with respect to certain preferred embodiments thereof, it is understood that various changes and modifications may be made in the description and drawings without departing from the inventive concept underlying the invention.

We claim:

1. A device for the production of granulated products from solutions or suspensions of food substances comprising: a heated chamber for keeping said solutions or suspensions under pressure having a bottom; through holes in the bottom of said heated chamber arranged along a concentrical circumference; a rotatable disk located inside said heated chamber and tightly pressed against said bottom of said chamber from inside; through holes in said rotatable disk along a concentrical circumference matching in succession with said holes in said bottom of said heated chamber during rotation of the disk; a means for rotation of said disk; a heat-insulating spacer arranged under said heated chamber; nozzles made in said heat-insulating spacer in the number equal to the number of said holes in said bottom and arranged coaxially with said holes; a vessel containing liquid for formation of granules from the solutions or the suspensions of food substances fed into said vessel via the holes in the bottom and provided with a cooling means; said vessel being actually a tubular heat exchanger installed under said chamber and attached to its bottom through said heat-insulating spacer; tubes of said tubular heat exchanger, whose upper ends are positioned in axial alignment with the holes in the bottom and communicating with said holes via the nozzles of said heat-insulating spacer, said tubes being equal in number to the number to the holes in the chamber bottom and being located so that the upper end of each tube accommodates one nozzle of said heat-insulating spacer with an annular gap to intercommunicate said tubes; a pipe for feeding forming liquid to said vessel, which communicates with said tubes through the annular gaps formed between said nozzles and the upper ends of said tubes; a flange adjoining said heat-insulating spacer receiving the top ends of said heat exchanger tubes; a cavity formed between said flange and said heat-insulating spacer providing fluid communication amongst said tubes and with the pipe supplying the forming liquid; and a pipe for taking granules with said forming liquid from said vessel.

2. A device according to claim 1, wherein said cavity is formed by a recess machined in the body of said flange.

3. A device according to claim 1, wherein said cavity is formed by a recess made in said heat-insulating spacer.

4. A device according to claim 1, wherein said cavity is formed partially by a recess machined in the body of said flange and partially by a recess made in said heat-insulating spacer.

5. A device according to claim 1, wherein said nozzles are made tapered downwards and the upper ends of said tubes of said heat exchanger are expanding topwise.

6. A device according to claim 1, wherein said nozzles and upper ends of said tubes of said heat exchanger are made cylindrical.

7. A device according to claim 1, wherein said heat exchanger comprises a shell adapted for circulation of a cooling agent and said tubes appropriately installed in said shell of said heat exchanger.

* * * * *